(12) United States Patent
Hueston et al.

(10) Patent No.: US 9,021,290 B2
(45) Date of Patent: Apr. 28, 2015

(54) SYSTEMS AND METHODS FOR DYNAMIC POWER MANAGEMENT IN A BLADE SERVER

(75) Inventors: Robert J. Hueston, Sunnyvale, CA (US); Julia D. Harper, Sunnyvale, CA (US); John Mulligan, Sunnyvale, CA (US); Michael Banatt, Sunnyvale, CA (US)

(73) Assignee: Oracle International Corporation, Redwood City, CA (US)

( * ) Notice: Subject to any disclaimer, the term of this patent is extended or adjusted under 35 U.S.C. 154(b) by 485 days.

(21) Appl. No.: 13/440,829

(22) Filed: Apr. 5, 2012

(65) Prior Publication Data
US 2013/0268779 A1 Oct. 10, 2013

(51) Int. Cl.
*G06F 1/32* (2006.01)

(52) U.S. Cl.
CPC .................... *G06F 1/3206* (2013.01)

(58) Field of Classification Search
CPC ........... G06F 1/26; G06F 1/32; G06F 1/3203; G06F 1/3206; G06F 1/3287; Y02B 60/1214; Y02B 60/1278; Y02B 60/1282

USPC .................. 713/300, 320, 324, 340
See application file for complete search history.

(56) References Cited

U.S. PATENT DOCUMENTS

| 7,350,090 | B2 * | 3/2008 | Baurer et al. | 713/300 |
| 7,353,415 | B2 * | 4/2008 | Zaretsky et al. | 713/320 |
| 8,402,296 | B2 * | 3/2013 | Brundridge et al. | 713/340 |

* cited by examiner

*Primary Examiner* — Thuan Du
(74) *Attorney, Agent, or Firm* — Martine Penilla Group LLP

(57) ABSTRACT

A system and method of dynamically managing a power supply allocation for each one of the server blades in a blade server includes a blade server system having a blade chassis, multiple server blades coupled to the blade chassis, a power supply system coupled to the blade chassis, a chassis management module coupled to the blade chassis, wherein the blade chassis includes electrical and data communication interconnections between the server blades, the redundant power supply system and the chassis management module. The chassis management module includes computer readable media having program instructions for dynamically managing a power supply allocation for each one of the server blades.

18 Claims, 7 Drawing Sheets

SYSTEMS AND METHODS FOR DYNAMIC POWER MANAGEMENT IN A BLADE SERVER

BACKGROUND

The present invention relates generally to blade computer server systems, and more particularly, to methods and systems for dynamically managing the power supplies in a blade computer server system.

Blade server systems are modular designs and typically have between six and sixteen blade slots. Each blade can be a processor, a memory sub-system, a storage blade, a network access or management sub-system or any one or more of any other sort of sub-systems needed for the server. A storage blade can contain one or more hard disk drive or equivalent mass storage media (magnetic media, optical media, non-volatile read/writeable memory devices, etc.). As a result, the power demands of each of the blades can vary depending upon the functions of and the performance demands on that blade.

The blade server systems typically have dual power supply units to provide redundancy in case the power supply failure. By way of example a typical blade server system could include two 4500 watt power supply units when the projected power demands of the blade server is less than 4500 watts.

The power ratings for each blade is typically based on the maximum power demands for the blade. However, each of the blades rarely is actually drawing full maximum power. Unfortunately, the power supply units are generally not sized to meet the simultaneous maximum power ratings of all blades and as a result the power supply allocations are limited to ensure the power demands of the blades does not exceed the power supply capacity of the power supply units. The typical power supply allocation is limited to allowing a blade to power on or not.

What is needed is a more flexible and dynamic management of the power allocations of the power supply units. The more flexible and dynamic management of the power allocations allows more of the blades to be powered on and thus increases the capability of the blade server system, without requiring oversized, less efficient power supply units.

SUMMARY

Broadly speaking, the present invention fills these needs by providing methods and systems for dynamically managing the power allocations in a blade computer server system. It should be appreciated that the present invention can be implemented in numerous ways, including as a process, an apparatus, a system, computer readable media, or a device. Several inventive embodiments of the present invention are described below.

One embodiment provides a blade server system having a blade chassis, multiple server blades coupled to the blade chassis, a redundant power supply system including at least two power supplies coupled to the blade chassis, a chassis management module coupled to the blade chassis, wherein the blade chassis includes electrical and data communication interconnections between the server blades, the redundant power supply system and the chassis management module. The chassis management module includes computer readable media having program instructions for dynamically managing a power supply allocation for each one of the server blades.

The program instructions for dynamically managing the power supply allocation for each one of the server blades can include program instructions for powering on a selected, previously powered off server blade including program instructions for receiving a request for power on in the chassis management module wherein the request is from the selected server blade, program instructions for calculating a power cap necessary power on the selected server blade and program instructions for allocating unallocated power to the selected server blade.

The program instructions for calculating the power cap necessary to power on the selected server blade can include program instructions for denying the power on request from the selected server blade when insufficient unallocated power is available. The program instructions for calculating the power cap necessary to power on the selected server blade can also include program instructions for selecting a first server blade of the multiple server blades, wherein the first server blade is presently powered on and program instructions for incrementally reducing an allocated power for the first server blade when the first server blade is allocated power greater than a corresponding minimum power requirement for the first server blade.

The program instructions for incrementally reducing the allocated power for the first server blade can also includes program instructions for reducing the allocated power by a selected percentage. Calculating the power cap necessary power on the selected server blade further can include program instructions for selecting a subsequent server blade that is presently powered on and incrementally reducing an allocated power for the subsequent server blade when the subsequent server blade is allocated power greater than a corresponding minimum power requirement for the subsequent server blade.

The computer readable media having program instructions for dynamically managing the power supply allocation for each one of the multiple server blades can include program instructions for determining whether to apply a hard power cap or a soft power cap including program instructions for converting a present allocated power level for all powered server blades to a hard cap power level when redundant allocated power is not available. The computer readable media having program instructions for dynamically managing the power supply allocation for each one of the multiple server blades can include program instructions for determining whether to apply a hard power cap or a soft power cap including program instructions for converting a present hard cap power level for all powered server blades to a soft cap power level when redundant allocated power is available.

The computer readable media having program instructions for dynamically managing the power supply allocation for each one of the multiple server blades can include program instructions for reallocating power when a blade powers off including program instructions for detecting a previously powered on server blade is now powered off and program instructions for incrementally increasing power allocated to each one of the multiple powered on server blades when a present power allocation is not equal to a corresponding maximum power allocation for each of the powered on server blades.

Another embodiment provides a blade server system including a blade chassis, multiple server blades coupled to the blade chassis, a redundant power supply system including at least two power supplies coupled to the blade chassis. A chassis management module is also coupled to the blade chassis. The blade chassis includes electrical and data communication interconnections between the multiple server blades, the redundant power supply system and the chassis management module. The chassis management module including computer readable media having program instructions for dynamically managing a power supply allocation for each one of the server blades includes program instructions for powering on a selected, previously powered off server blade including program instructions for receiving a request for power on in the chassis management module. The request is from the selected server blade. Program instructions for calculating a power cap necessary power on the selected server blade include program instructions for denying the power on request from the selected server blade when insufficient unallocated power is available, program instructions for selecting a first server blade from the server blades, wherein the first server blade is presently powered on and program instructions for incrementally reducing an allocated power for the first server blade when the first server blade is allocated power greater than a corresponding minimum power requirement for the first server blade. Also included are program instructions for allocating unallocated power to the selected server blade and program instructions for determining whether to apply a hard power cap or a soft power cap including program instructions for converting a present allocated power level for all powered server blades to a hard cap power level when redundant allocated power is not available.

Yet another embodiment provides a method of dynamically managing power supply allocation for each one of multiple server blades in a blade server including powering on a selected, previously powered off server blade including receiving a request for power on in the chassis management module wherein the request is from the selected server blade, calculating a power cap necessary power on the selected server blade and allocating unallocated power to the selected server blade.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for methods and systems for dynamically managing the power allocations in a blade computer server system will now be described. It will be apparent to those skilled in the art that the present invention may be practiced without some or all of the specific details set forth herein.

In a typical blade server chassis, there may be a variable number of server blades with varying power requirements as described above. Typically the blade server chassis power supply units provide sufficient power to handle a typical configuration of blades under typical power loads and performance demands and still provide full redundancy. However, there may not be enough power provided by the power supply units to handle all blade slots being populated with the maximum possible powered blades.

A chassis management module typically only allows blades to power on if there is enough power for all blades to power on, or allow some blades to power on until all power has been allocated to the blades, then prevent additional blades from powering on, or allow all blades to power on and warn the user that power supply redundancy requirements are not being met. Operating without full power supply redundancy is a dangerous approach and can damage the devices on the blades due to brown out conditions. Operating without full power supply redundancy is also dangerous because a loss of a single power unit power inlet feed or a failure of a single power unit could result in excess power demands on the remaining power unit, thus exceeding its rating and shutting down and causing the entire blade server system to lose power.

Newer blade server sub-systems have faster processors and more memory and storage which increases power demands. Thus the power management problem is constantly growing. Dynamic power management allows blades to power on until the power supply redundancy limit is reached. Once the power supply redundancy limit is reached, the chassis management module dynamically reduces the power allocated to one or more blades in order to free up sufficient power allocations for one or more additional blades.

Dynamic power management can also enhance and improve the overall power efficiency of the server individually and the server farm that the server is part of. Power consumption and cooling demands of server farms is ever growing concern. Dynamic power management can allow smaller, more efficient power supplies to supply the power needs of newer faster processors.

Figure 1:
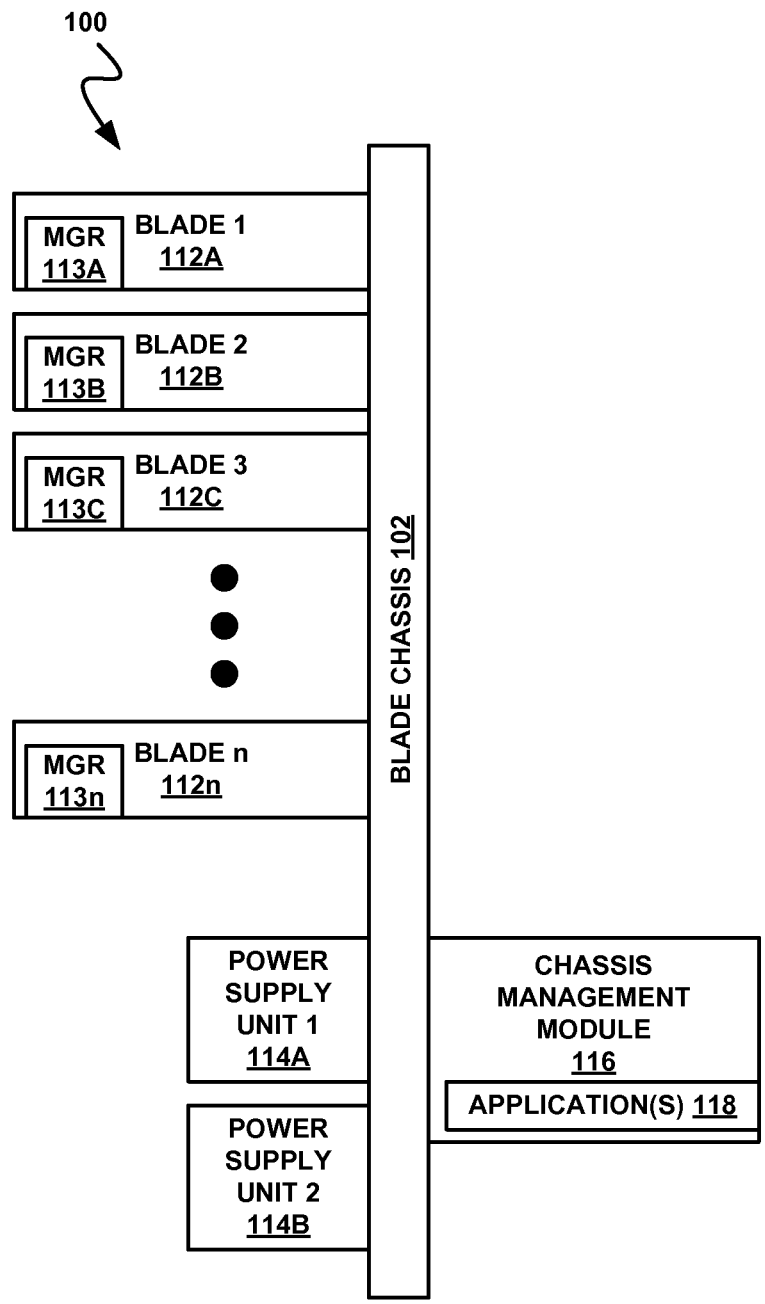
FIG. 1 is a simplified block diagram of a blade server, in accordance with embodiments of the present invention.

FIG. 1 is a simplified block diagram of a blade server 100 in accordance with embodiments of the present invention. The blade server includes a blade chassis 102. Redundant power supply units 114A, 114B and chassis management module 116 are mounted on the blade chassis 102. Multiple blades 112A-112n are also mounted on the blade chassis 102. The blade chassis 102 provides structural support, facilities support (e.g., cooling, etc.), electrical power and data connections to each of the multiple blades 112A-112n. The redundant power supply units 114A, 114B provide the electrical power for the blade chassis 102 and the blades 112A-112n mounted thereon. The chassis management module 116 includes operating system and applications 118 for managing the operations of the blade server 100, some aspects of which are described in more detail herein.

The maximum power requirements for each of the blades 112A-112n are rarely demanded, and when the maximum power supply requirements are demanded it is usually for a relatively short duration. Thus, the redundant power supplies 114A, 114B sized for the simultaneous continuous maximum power supply requirements for all of the blades 112A-112n is typically excessively oversized for the actual electrical power demand of the blades and is thus less efficient than it could be.

Figure 2:
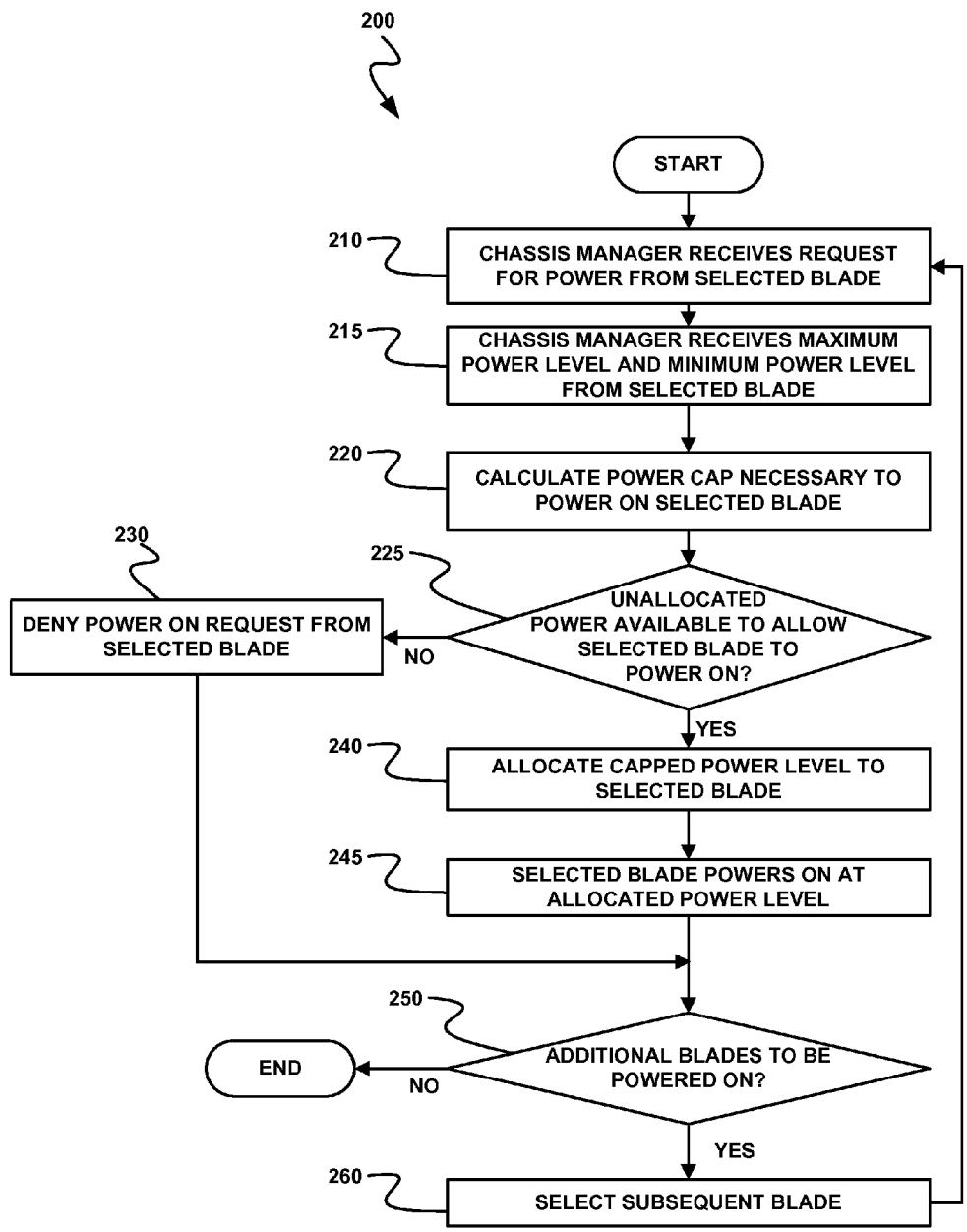
FIG. 2 is a flowchart of the method operations for powering on a blade, in accordance with embodiments of the present invention.

One example is where one of the blades 112C requests to power on when the blade was previously not powered on. FIG. 2 is a flowchart of the method operations 200, for powering on blade 112C, in accordance with embodiments of the present invention. The operations illustrated herein are by way of example, as it should be understood that some operations may have sub-operations and in other instances, certain operations described herein may not be included in the illustrated operations. With this in mind, the method and operations 200 will now be described.

In an operation 210, the chassis management module 116, receives a request for power from the select blade 112C. This request can come in multiple forms, by way of example, the request can be a data request from a blade manager 113C, sent to the chassis management module 116. Alternatively, the request can be generated automatically when the chassis management module 116 detects when blade 112C is inserted into the blade chassis 102, or the chassis management module 116 can detect a "POWER ON" condition change in blade 112C.

In an operation 215, the chassis management module 116, determines the maximum and minimum power requirements of the selected blade 112C. The maximum and minimum power requirements of the selected blade 112C can be determined in any one or more manners. By way of example, the maximum and minimum power requirements can be communicated from the corresponding blade manager 113C to the chassis management module 116 as part of the request for power on. Alternatively, the chassis management module can query the blade manager 113C for the maximum and minimum power requirements in response to the power on request. In still another alternative, the corresponding maximum minimum power requirements could be automatically or manually configured and stored in the chassis management module 116 when the selected blade 112C is initially installed. By way of example, the corresponding maximum minimum power requirements could be stored as part of the application 118 and the related application data.

In an operation 220, the chassis management module 116, analyzes the present power supply allocations to the other blades that are already powered on to calculate a power cap required to provide sufficient power for the maximum power demands of the selected blade 112C. Operation 220 is described in more detail in FIG. 3 below.

In an operation 225, if unallocated power is not available to allow the selected blade 112C to power on, then the power on request from the select blade is denied in an operation 230 and the method operations continue in an operation 250 as described below. If in operation 225, unallocated power is available to allow the selected blade 112C to power on, then the method operations continue in an operation 240.

In operation 240, the calculated power cap power level determined in operation 220 above is allocated to the selected blade 112C and in an operation 245 the selected blade is allowed to power on and the method operations continue in operation 250.

In operation 250, the chassis management module 116 determines if additional blades are requesting power on. If one or more additional blades are requesting power on, then the method operations continue in operation 260, to select a subsequent requesting blade and the method operations continue in operation 210 as described above. If no additional blades are requesting power on the method operations can end.

Power caps can be in two forms: as a soft cap or as a hard cap. A soft cap is a maximum power quantity that a blade 112A-112n might exceed in the rare occasion that the blade will temporarily consume a maximum power quantity that is greater than the allocated value. In contrast, a hard cap is a strictly enforced limit on the power allocated to a blade 112A-112n. The hard cap will prevent the blade from operating at greater than the allocated power assigned to the blade. As a result of hard cap can be enforced by throttling (e.g., reducing processing rate of) a blade or otherwise by limiting or removing power supplied to the blade.

By way of example of a soft cap, if the total available allocated power is 4800 watts and 4600 watts is allocated to blades 112A-112n and blade 112A wishes to switch to a maximum power allocation of 400 additional watts for a short duration, then the total allocated power would be 5000 watts. However, only 4800 watts redundant power is available to be allocated. However it is also known that most of the blades 112A-112n are not consuming 100 percent of the power allocated to each blade all of the time. Thus, on a temporary basis, blade 112A can be allowed the additional 400 watts because some of the other blades 112B-112n are not using 100 percent of their allocated power. The power the other blades 112B-112n are not consuming is most likely enough to support the additional 400 watts for blade 112A, at least on a temporary basis. When the blade power consumption does exceed the maximum power allocation, the blade may be momentarily throttled (e.g., reducing processing rate of) until the blade power consumption is below the maximum power allocation for the blade.

By way of example of a hard cap, if the total available allocated power is 4800 watts and 4600 watts is allocated to blades 112A-112n and blade 112A wishes to switch to a maximum power allocation of 400 additional watts for a short duration, then the total allocated power would be 5000 watts. However, only 4800 watts is available to be allocated so a hard cap would deny blade 112A's request to an increased power allocation. Further, a hard cap can also cause a power off one or more blades to free up additional power before allowing blade 112A's increase power allocation request. The hard cap can also prevent the blade from operating at greater than the allocated power assigned to the blade by proactively throttling a blade so that even under maximum load it cannot exceed the power allocation, or otherwise by powering off the blade. Unlike a soft cap, a hard cap typically results in a continuous reduction in blade performance.

Caps can be applied individually to each blade 112A-112n, or universally to all blades or combination thereof. By way of example, with an individual 70% cap allocated to blade 112A, then only blade one 112A is allocated 70% of blade 112A's maximum power requirement. The remaining blades 112B-112n would be allocated 100% of their corresponding maximum power requirements. Individual caps are used to allocate the power to a particular blade. For example, a very high power consuming blade 112B, can be allocated only 70% of its maximum power requirements to reduce the total quantity of allocated power.

By way of example, in a universal 100% cap, each blade 112A-112n is allocated 100% of their maximum power requirement. Similarly, a universal 90% cap, allocates 90% of each blade 112A-112n maximum power requirement. Universal caps are allocated to reduce the total allocated power to all of the blades 112A-112n. Universal caps are used to provide unallocated power to be used to power on a new blade 112C.

As an example of a combination universal and individual cap, a universal 85% cap, allocates 85% of each blade 112A-112n maximum power requirement, and an additional individual cap 70% can be applied to a single blade (e.g., blade 112B).

Figure 3:
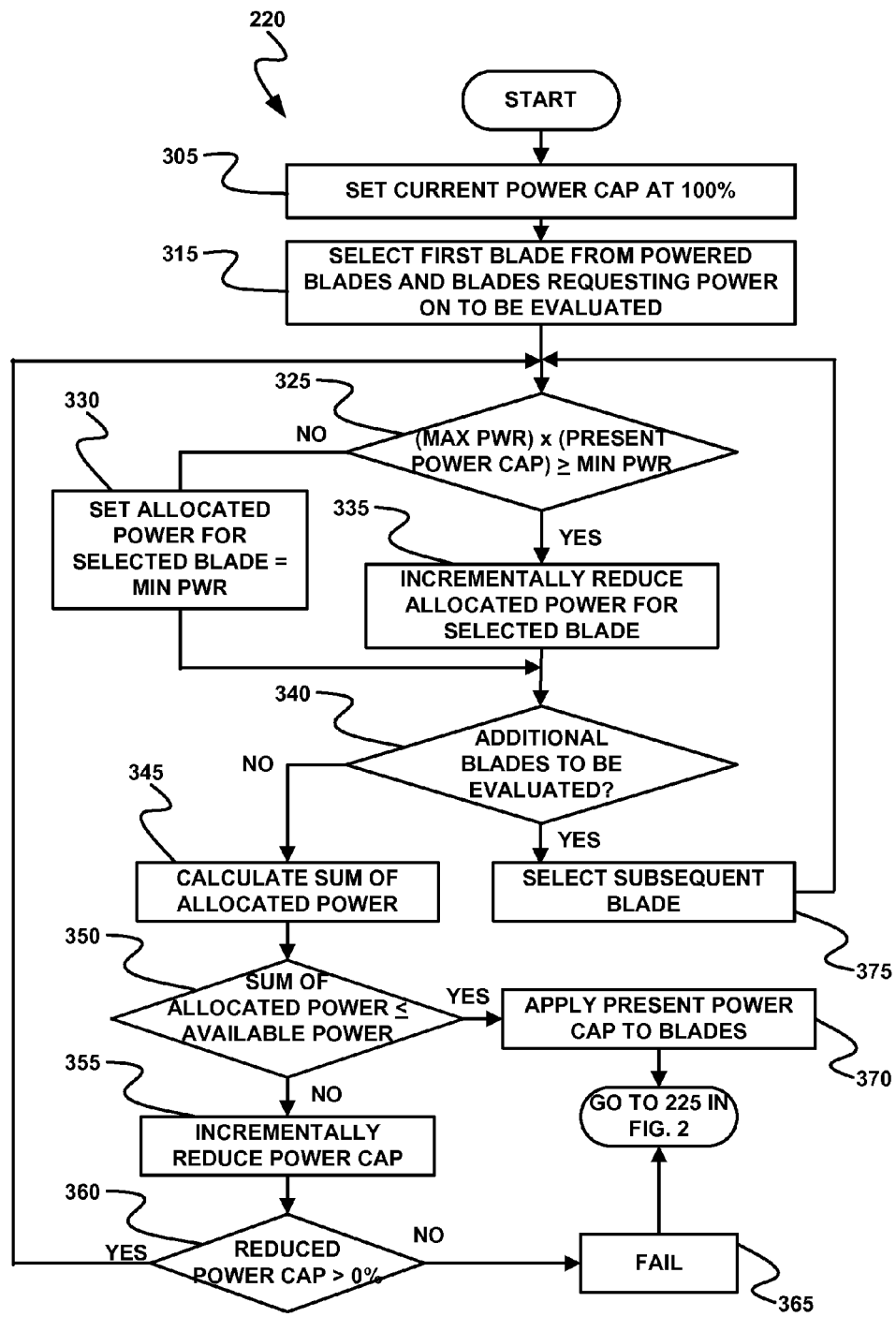
FIG. 3 is a flowchart of the method operations for calculating a power cap, in accordance with embodiments of the present invention.

FIG. 3 is a flowchart of the method operations 220, for calculating a power cap, in accordance with embodiments of the present invention. The operations illustrated herein are by way of example, as it should be understood that some operations may have sub-operations and in other instances, certain operations described herein may not be included in the illustrated operations. With this in mind, the method and operations 300 will now be described. The chassis management module 116, analyzes the present power supply allocations to the other blades that are already powered on to determine how much power is not previously allocated and to calculate the power cap required to provide sufficient power for the selected blade 112C.

In an operation 305, the present power cap is set at 100%. The 100% initial power cap is an arbitrary starting point. Initial power cap could be any number 100% or less (e.g., 90, 72, 50, 41, etc.) as well.

In an operation 315, one of the blades 112A-112n is selected for analysis of the actual power needs of the selected blade 112A. As described above, in operation 215 of FIG. 2 above, the chassis management module 116 has previously received the maximum and minimum power requirements of each blade including the selected blade 112A. The selected blade can be selected by any acceptable method such as according to a manually set priority level for each of the blades or subsets of the blades. By way of example, some blades may be more vital to the operations of the blade server (e.g., processor blades) and some blades can be less vital to the operations of the blade server (e.g., some storage blades may be less often accessed than storage blades). Thus the lower priority blades may have power caps applied to them before a blade having a higher priority. Further, in some instances, the blade having the higher priority may not have a power cap applied unless or until all of the lesser prioritized blades have had their power caps reduced to their respective minimum power levels.

In operation 325, the present power cap assigned to the selected blade 112A is analyzed to determine if the selected blade can be reduced in allocated power. If the maximum power requirements for the selected blade 112A multiplied by the present power cap assigned to the selected blade is less than or equal to the minimum power requirements of the selected blade, then in an operation 330, the allocated power for the selected blade 112A is set to the minimum power requirements for the selected blade and the method operations continue in operation 340.

If the maximum power requirements for the selected blade 112A multiplied by the present power cap assigned to the selected blade is greater than the minimum power requirements of the selected blade, then the allocated power for the selected blade 112A is reduced an incremental amount in an operation 335 and the method operations continue in operation 340. The present allocated power can be reduced by an incremental reduction. By way of example as shown, a 5% incremental reduction in allocated power can be applied. Similarly, the incremental power allocation reduction could be chosen as 1%, 2%, 10%, 25%, or any other suitable increment that may be selected. Applying the power cap can alternatively be based on an absolute power (e.g., a selected quantity of power or a selected number of watts per blade) instead of a percentage of maximum power. The incremental power cap reduction can be in the form of an actual number of watts per blade. By way of example, a 1000 watt cap per blade can be reduced by 50 watts to 950 watts rather than reduced by 5% to 950 watts. Applying the power cap can alternatively be based as a percentage between the minimum power level and the maximum power level. By way of example, when the power cap reaches 0% for a specific blade then the blade is allocated its respective minimum power level. Further, when the power cap is at 50%, for a specific blade then the blade is allocated its respective minimum power level+½ (maximum power level−minimum power level).

In operation 340, an inquiry is made to determine if additional blades are available to be evaluated. If additional blade are due to be evaluated the method operations continue in operation 375. In operation 375 a subsequent blade is selected and the method operations continue in operation 325 as described above.

If no additional blades are due to be evaluated the method operations continue in operation 345. In operation 345 a sum of the presently allocated power is calculated. The sum of the presently allocated power is calculated by adding up all of the power allocations to each of the respective blades 112A-112n.

In an operation 350, the sum of the presently allocated power is compared to the available power. If the sum of the presently allocated power is less than or equal to the available power, then the method operations continue in an operation 370. In operation 370, the present power cap is applied to all powered blades 112A-112n and the method operations continue in operation 225 of FIG. 2.

If the sum of the presently allocated power is greater than the available power, then the method operations continue in an operation 355. In operation 355, the present power cap is reduced and the method operations continue in an operation 360. The present power cap can be reduced by an incremental reduction in operation 360. By way of example, a 5% incremental reduction in power cap can be applied. Similarly, the incremental power cap reduction could be chosen as 1%, 2%, 10%, 25%, or any other suitable increment that may be selected. The incremental power cap reduction can be in the form of an actual number of watts per blade. By way of example, a 1000 watt cap per blade can be reduced by 50 watts to 950 watts rather than reduced by 5% to 950 watts.

In operation 360, the reduced power cap is analyzed to determine if it is greater than 0%. If the reduced power cap is greater than 0%, the method operations continue in operation 315 as described above. If the reduced power cap is less than or equal to 0% or all blades have been reduced to their respective minimum power allocations, the method operations continue in operation 365 as a failure in determining a usable reduced power cap or reallocation of power that will allow powering on the new blade 112C and the method operations continue in operation 225 of FIG. 2. In the event of a FAIL condition in operation 365, an optional operation could include selecting a blade (e.g., according to a priority or some other selection criteria as described elsewhere herein) and power off the selected blade, then the method operations can continue in operation 315 as described above.

Figure 4:
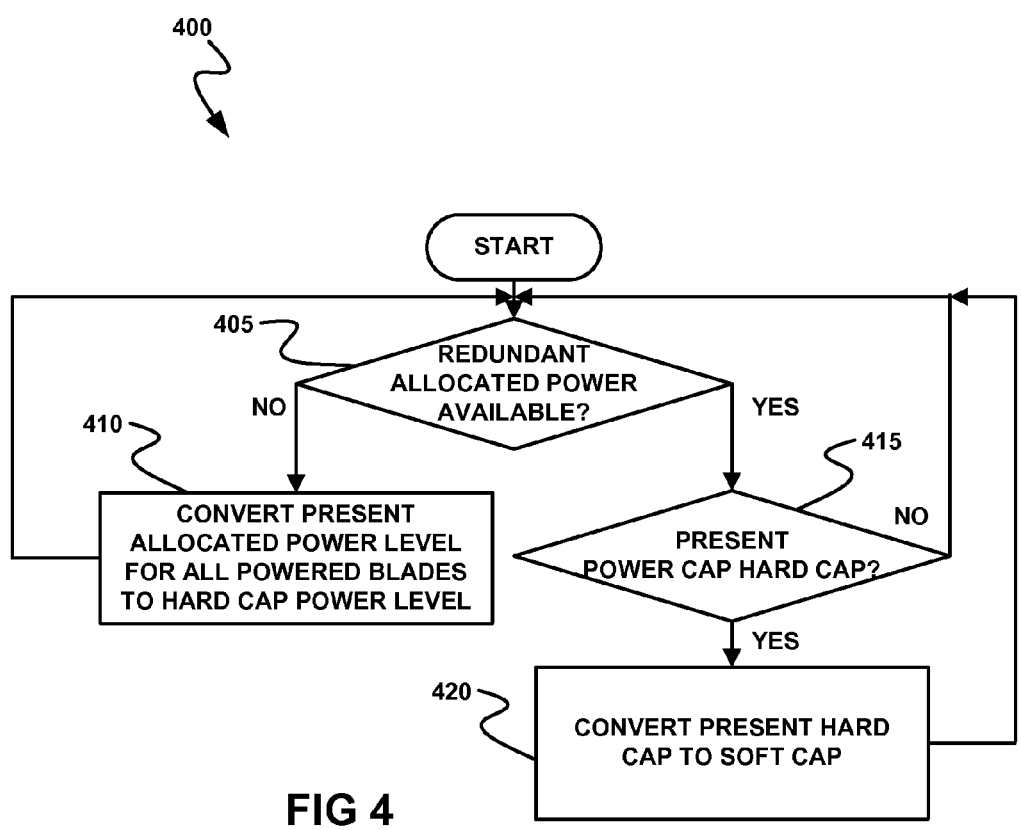
FIG. 4 is a flowchart of the method operations for determining whether to apply a hard power cap or a soft power cap, in accordance with embodiments of the present invention.

FIG. 4 is a flowchart of the method operations 400, for determining whether to apply a hard power cap or a soft power cap, in accordance with embodiments of the present invention. This is a constant review process to dynamically set hard and soft caps as needed. The operations illustrated herein are by way of example, as it should be understood that some operations may have sub-operations and in other instances, certain operations described herein may not be included in the illustrated operations. With this in mind, the method and operations 400 will now be described.

In an operation 405, the chassis management module 116, analyzes the present power supply capacity and present power allocations to determine if redundant power supply capacity is available for all present power allocations. As described above, the blade server system 100, includes two power supplies 114A, 114B. The two power supplies 114A, 114B provide redundant power sources in case one power supply fails, the remaining power supply can supply the operational needs of the blade server system 100.

If, in operation 405, redundant power supply capacity is not available for all present power allocations then the method operations continue in an operation 410. In operation 410, the present allocated power levels for all the powered blades are converted to a hard cap. Converting the allocated power levels to a hard cap limits the available power for each blade to only a level having redundant power capacity always available. As described above, the hard cap limits the power consumption to less than or equal to the hard cap allocated power level such as by limited processing speed of the respective blade.

If in operation 405, redundant power supply capacity is available for all present power allocations then the method operations continue in an operation 415. In operation 415, the present power cap is analyzed to determine if the present power cap is a hard cap or a soft cap. If the present power cap is a soft cap, then the method operations continue in operation 405, as described above. A soft cap allows power allocations to be exceeded for relatively short durations. It is extremely unlikely that all blades will be operating near or above their respective soft cap power limits at exactly the same time, however, if the power draw from all the blades momentarily exceeds the soft cap, the existence of redundant power supply ensures that a single power unit will not exceed its rated output and shut down. In order to minimize this risk to the blade server system, blades can automatically limit the time duration that they may exceed the soft cap for a relatively a short time duration, for example, less than about one second.

If the present power cap is a hard cap, then the method operations continue in an operation 420. In operation 420, the present hard cap is converted to a soft cap, then the method operations continue in operation 405, as described above.

Figure 5:
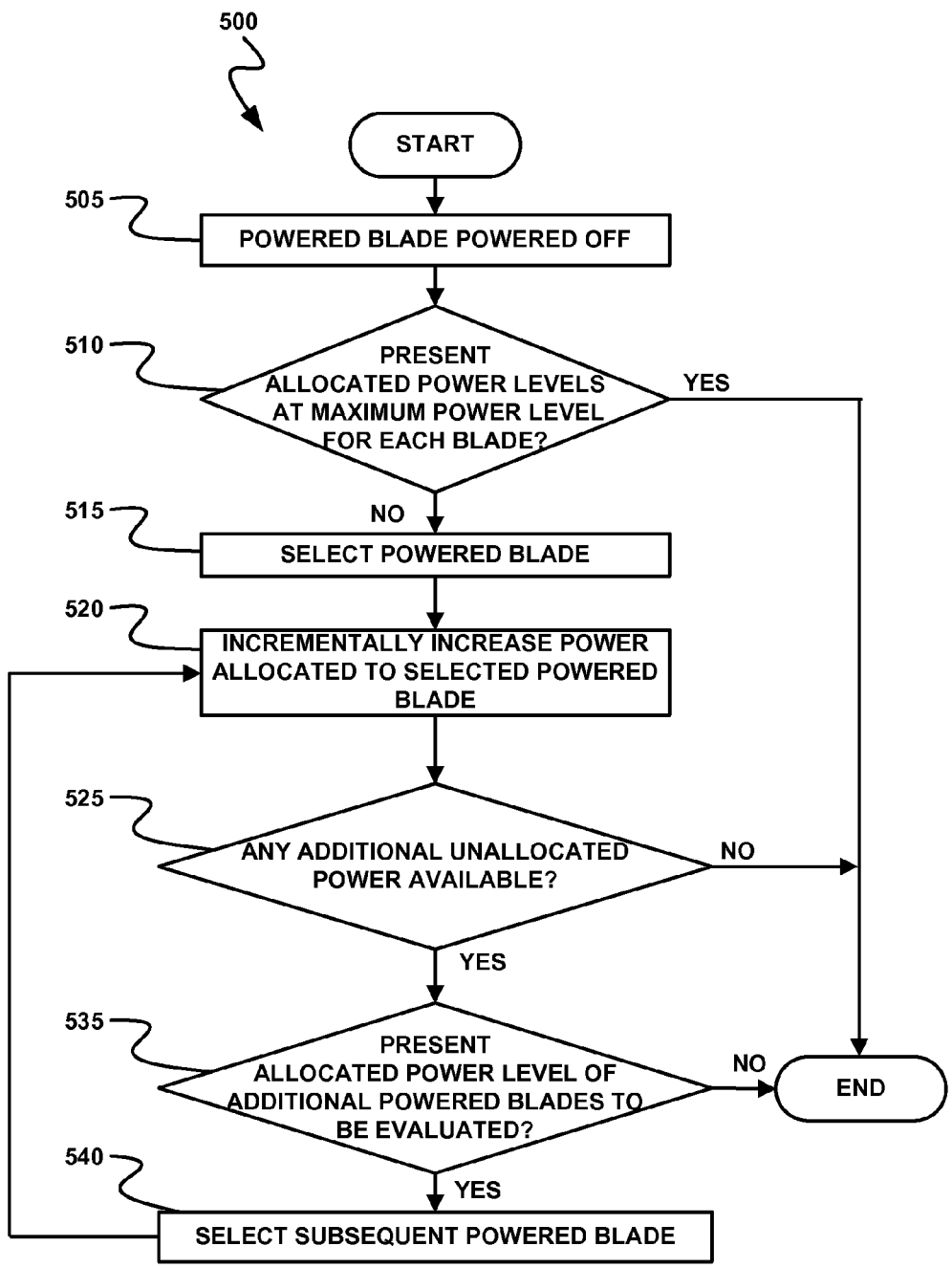
FIG. 5 is a flowchart of the method operations for reallocating power when a blade powers off, in accordance with embodiments of the present invention.

The processes described above for the instance when a previously off blade is requesting a power on condition, the chassis management module 116 determines if sufficient power is available. In an instance where a powered blade is changing to a power off condition, non-allocated power will become available to be allocated to the remaining powered on blades. In this instance, the chassis management module 116 determines how to reallocate this on allocated power. When a blade powers off, the method operation 300 as described in FIG. 3 can be repeated. One starting point would be to start at 100% power allocation and then systematically reduce the power allocations until the sum of allocated power is less than or equal to the available power. FIG. 5 describes another embodiment for reallocating power when a blade powers off.

FIG. 5 is a flowchart of the method operations 500, for reallocating power when a blade powers off, in accordance with embodiments of the present invention. The operations illustrated herein are by way of example, as it should be understood that some operations may have sub-operations and in other instances, certain operations described herein may not be included in the illustrated operations. With this in mind, the method and operations 500 will now be described.

In an operation 505, a selected powered blade 112A is powered off. The selected powered blade 112A can be powered off for numerous reasons. By way of example, the chassis management module 116, may power off the selected blade 112A due to insufficient power supply being available such as may occur in the event the power supply failure. Chassis management module 116 can also include applications 118 that will prioritize the operations of the various blades 112A-112n and accordingly, power off blades with a lower priority when insufficient power is available. The selected blade 112A may also power off due to the blade failure or removal or a selected power off condition of the blade or any other reason the blade is powered off.

In an operation 510, the present allocated power levels for each of the remaining powered on blades 112B-112n are analyzed to determine if the remaining powered blades are allocated at their respective maximum power levels. If the remaining powered blades are allocated at their respective maximum power levels, then the method operations can end.

If the remaining powered blades are not allocated at their respective maximum power levels, then the method operations continue in an operation 515. In operation 515, a powered blade 112B is selected. The selected blade 112B can be selected in any one of a number of suitable methods. By way of example, the selected blade can be a higher priority blade in a blade operations priority table stored in the chassis management module 116. Alternatively, the selected blade can be the blade having the greatest actual power reduction or the greatest percentage power reduction. Or any other suitable selection scheme as may be desired, including manually selection or a manually preset priority selection determined at some previous time (e.g., upon power on of the respective blade or during the initial installation of the respective blade or any other blade).

In an operation 520, the allocated power for the selected blade 112B is increased an incremental amount and the method operations continue in operation 525. The present allocated power can be increased by an incremental increase. By way of example, as shown, a 5% incremental increase in allocated power can be applied. Similarly, the incremental power allocation increase could be chosen as 1%, 2%, 10%, 25%, or any other suitable increment that may be selected. Alternatively, the allocated power for the selected blade 112B can be increased to a maximum power level (e.g., to 100%). The incremental power cap increase can be in the form of an actual number of watts. By way of example, a 950 watt cap can be increased by 50 watts to 1000 watts maximum level rather than increased by 5%.

If no additional unallocated power remains available in operation 525, then the method operations can end. If additional unallocated power remains available in operation 525, then the method operations continue in an operation 535.

In operation 535, the respective power allocation for each remaining presently powered blades are examined to determine if any presently powered blades remain to be evaluated. If no additional, presently powered blades remain to be evaluated then the method operations can end. If additional, presently powered blades remain to be evaluated then the method operations continue in an operation 540. In operation 540 a subsequent one of the presently powered blades is selected for evaluation and the method operations continue in operation 520 as described above.

Figure 6:
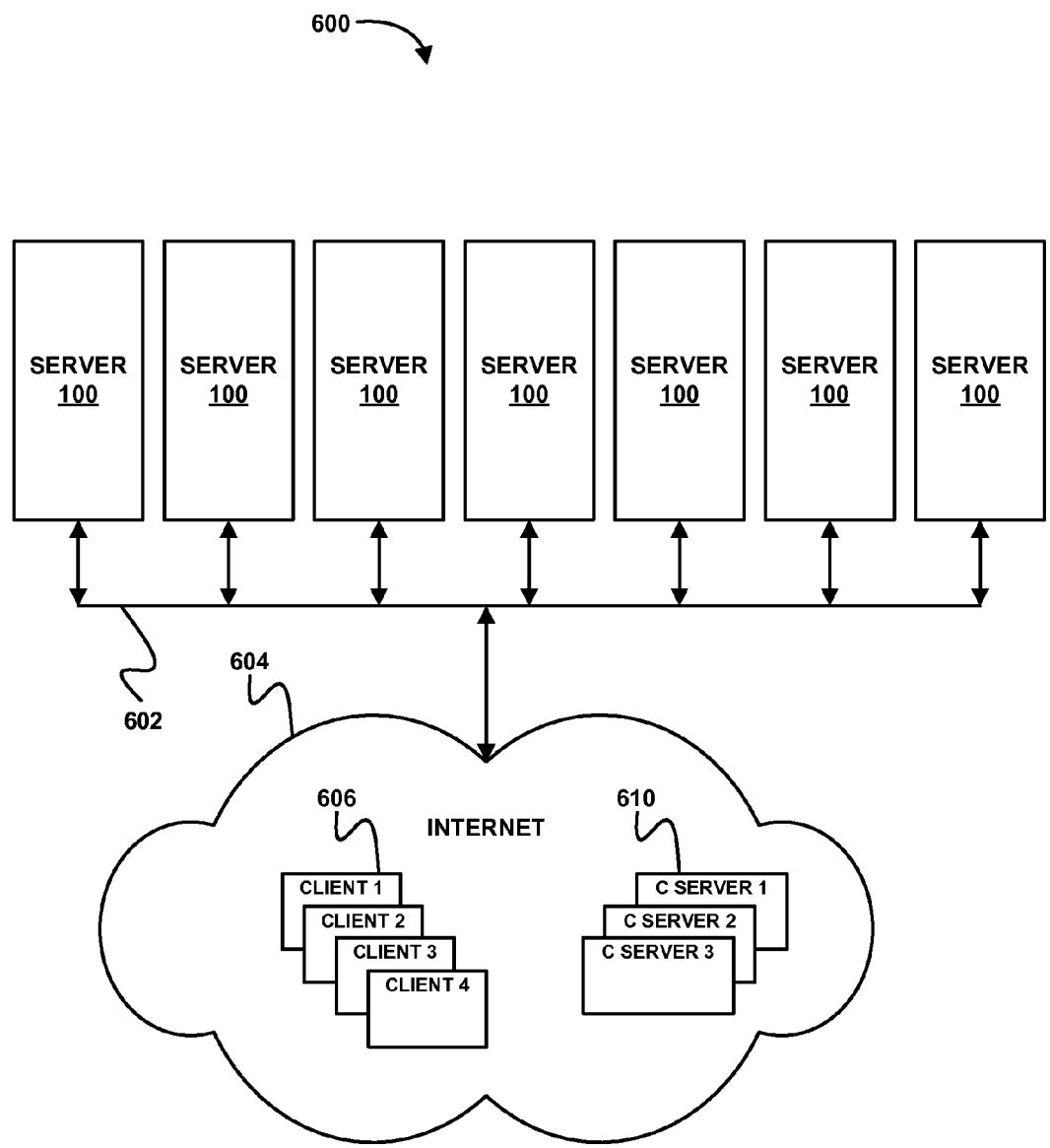
FIG. 6 is a simplified block diagram of a server system having multiple servers and clients, in accordance with embodiments of the present invention.

FIG. 6 is a simplified block diagram of a server system 600 having multiple servers 100, 610 and clients 606, in accordance with embodiments of the present invention. The server system 600 includes multiple servers 100 coupled by a network 602. The network 602 is also coupled to the Internet 604. Multiple clients 606 are also coupled to the network 602 via the Internet 604. Additional servers 610 can be cloud servers coupled to the network 602 via the Internet 604 and capable of serving data to the clients 606 or to the servers 100. Dynamically managing the power supplies of the servers can also reduce facility requirements including power consumption and cooling requirements for each of the servers 100, 610, and for the server farm that the servers reside in.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 7:
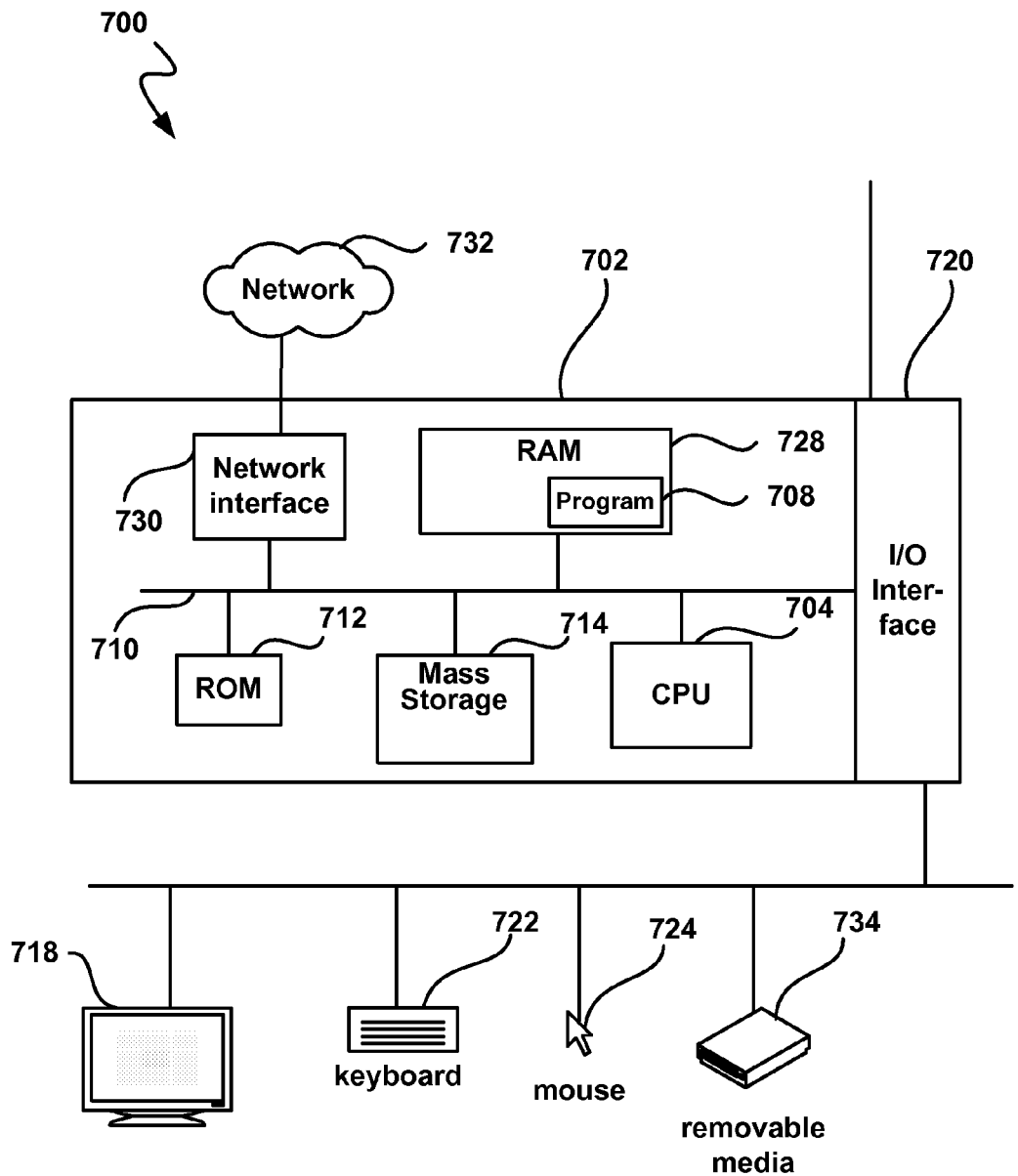
FIG. 7 is a block diagram of an exemplary computer system for carrying out the processing according to the invention.

FIG. 7 is a block diagram of an exemplary computer system 700 for carrying out the processing according to the invention. The computer system 700 includes a digital computer 702, a display screen (or monitor) 718, a floppy disk/optical/flash/removable media drive 734, a mass storage subsystem (hard disk drive, flash memory drive, etc.) 714, a network interface 730, and a keyboard 722. The digital computer 702 includes a processor 704, a data bus 710, random access memory (RAM) 728, read only memory (ROM) 712, and an I/O interface 720. The digital computer 702 can be a personal computer (such as an IBM compatible personal computer, a Macintosh computer or Macintosh compatible computer), a workstation computer (such as a Sun Microsystems or Hewlett-Packard workstation), or some other type of computer.

The processor 704 is a general purpose digital processor, which controls the operation of the computer system 700. The processor 704 can be a single-chip processor or can be implemented with multiple components. The processor 704 can also include multiple processors. Using program instructions 708 retrieved from memory 728, the processor 704 controls the reception, manipulation and transformation of input data and the output and display of data on output devices and to other user devices via the network 732.

The data bus 710 is used by the processor 704 to access the RAM 728 and the ROM 712. The RAM 728 is used by the processor 704 as a general storage area and as scratch-pad memory, and can also be used to store input data and processed data. The ROM 712 can be used to store instructions or program code followed by the processor 704 as well as other data.

The bus 710 is also used to access the input, output, and storage devices used by the digital computer 702. In the described embodiment, these devices include the display screen 718, the floppy disk/optical/flash drive 734, the mass storage 714, and the network interface 730.

The display screen 718 is an output device that displays images of data provided by the processor 704 via the data bus 710 or provided by other components in the computer system 700. The floppy disk/optical/flash/removable media drive 734 and the mass storage 714 can be used to store various types of data. The floppy disk/optical/flash/removable media drive 734 facilitates transporting such data to other computer systems. The mass storage 714 permits fast access to large amounts of stored data.

The processor 704 together with an operating system operate to execute computer code and produce and use data. The computer program code 708 and data may reside on the RAM 728, the ROM 712, or in the mass storage 714. The computer code 708 and data could also reside on a removable program medium and loaded or installed onto the computer system 700 when needed. Removable program media include, for example, CD-ROM, PC-CARD, floppy disk, flash memory, optical media and magnetic tape.

The network interface 730 is used to send and receive data over a network connected to other computer systems. An interface card or similar device and appropriate software implemented by the processor 704 can be used to connect the computer system 700 to an existing network and transfer data according to standard protocols.

The keyboard 722 is used by a user to input commands and other instructions to the computer system 700. Other types of user input devices can also be used in conjunction with the present invention. For example, pointing devices such as a computer mouse 724, a track ball, a stylus, or a tablet can be used to manipulate a pointer on a screen of a general-purpose computer.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code and/or logic on a computer readable medium. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, flash memory, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A blade server system comprising:
a blade chassis;
a plurality of server blades coupled to the blade chassis;
a power supply system coupled to the blade chassis; and
a chassis management module coupled to the blade chassis, wherein the blade chassis includes electrical and data communication interconnections between the plurality of server blades, the redundant power supply system and the chassis management module, the chassis management module including computer readable media having program instructions for dynamically managing a power supply allocation for each one of the plurality of server blades including program instructions for powering on a selected, previously powered off server blade including:
program instructions for receiving a request for power on in the chassis management module wherein the request is from the selected server blade;
program instructions for calculating a power cap necessary to power on the selected server blade;
program instructions for determining whether to apply a hard power cap or a soft power cap including converting a present hard cap power level for all powered server blades to a soft cap power level when redundant allocated power is available, wherein the soft power cap allows an allocated power level to be exceeded for a selected time duration; and
program instructions for allocating unallocated power to the selected server blade.

2. The system of claim 1, wherein the program instructions for calculating the power cap necessary power on the selected server blade includes program instructions for denying the power on request from the selected server blade when insufficient unallocated power is available.

3. The system of claim 1, wherein the program instructions for calculating the power cap necessary power on the selected server blade includes:
program instructions for selecting a first server blade from the plurality of server blades, wherein the first server blade is presently powered on; and
program instructions for incrementally reducing an allocated power for the first server blade when the first server blade is allocated power greater than a corresponding minimum power requirement for the first server blade.

4. The system of claim 3, wherein the program instructions for incrementally reducing the allocated power for the first server blade includes program instructions for reducing the allocated power by a selected percentage.

5. The system of claim 3, wherein calculating the power cap necessary power on the selected server blade further includes program instructions for selecting a subsequent server blade that is presently powered on and incrementally reducing an allocated power for the subsequent server blade when the subsequent server blade is allocated power greater than a corresponding minimum power requirement for the subsequent server blade.

6. The system of claim 3, wherein incrementally reducing the allocated power for the first server blade when the first server blade is allocated power greater than the corresponding minimum power requirement for the first server blade includes a incremental power cap reduction of a selected number quantity of power.

7. The system of claim 3, wherein the program instructions for selecting the first server blade from the plurality of server blades includes selecting the selected blade according to a priority level corresponding to each one of the plurality of server blades.

8. The system of claim 1, wherein the computer readable media having program instructions for dynamically managing the power supply allocation for each one of the plurality of server blades includes program instructions for determining whether to apply a hard power cap or a soft power cap including program instructions for converting a present hard cap power level for all powered server blades to a soft cap power level when redundant allocated power is available.

9. The system of claim 1, wherein the computer readable media having program instructions for dynamically managing the power supply allocation for each one of the plurality of server blades includes program instructions for reallocating power when a blade powers off including:
program instructions for detecting a previously powered on blade is now powered off; and
program instructions for incrementally increasing power allocated to each one of a plurality of powered on server blades when a present power allocation is not equal to a corresponding maximum power allocation for each of the plurality of powered on server blades.

10. The system of claim 1, wherein the power supply system includes a redundant power supply system including at least two power supplies.

11. A blade server system comprising:
a blade chassis;
a plurality of server blades coupled to the blade chassis;
a redundant power supply system including at least two power supplies coupled to the blade chassis;
a chassis management module coupled to the blade chassis, wherein the blade chassis includes electrical and data communication interconnections between the plurality of server blades, the redundant power supply system and the chassis management module, the chassis management module including computer readable media having program instructions for dynamically managing a power supply allocation for each one of the plurality of server blades includes program instructions for powering on a selected, previously powered off server blade including:
program instructions for receiving a request for power on in the chassis management module wherein the request is from the selected server blade;
program instructions for calculating a power cap necessary power on the selected server blade including:
program instructions for denying the power on request from the selected server blade when insufficient unallocated power is available;
program instructions for selecting a first server blade from the plurality of server blades, wherein the first server blade is presently powered on; and
program instructions for incrementally reducing an allocated power for the first server blade when the first server blade is allocated power greater than a corresponding minimum power requirement for the first server blade;
program instructions for determining whether to apply a hard power cap or a soft power cap including converting a present hard cap power level for all powered server blades to a soft cap power level when redundant allocated power is available, wherein the soft power cap allows an allocated power level to be exceeded for a selected time duration;

program instructions for allocating unallocated power to the selected server blade; and program instructions for determining whether to apply a hard power cap or a soft power cap including program instructions for converting a present allocated power level for all powered server blades to a hard cap power level when redundant allocated power is not available.

12. A method of dynamically managing power supply allocation for each one of a plurality of server blades in a blade server comprising:

powering on a selected, previously powered off server blade including:

receiving a request for power on in the chassis management module wherein the request is from the selected server blade;

calculating a power cap necessary power on the selected server blade;

determining whether to apply a hard power cap or a soft power cap including converting a present hard cap power level for all powered server blades to a soft cap power level when redundant allocated power is available, wherein the soft power cap allows an allocated power level to be exceeded for a selected time duration; and allocating unallocated power to the selected server blade.

13. The method of claim 12, further comprising denying the power on request from the selected server blade when insufficient unallocated power is available.

14. The method of claim 12, further comprising selecting a first server blade from the plurality of server blades, wherein the first server blade is presently powered on and reducing an allocated power for the first server blade when the first server blade is allocated power greater than a corresponding minimum power requirement for the first server blade.

15. The method of claim 12, further comprising determining whether to apply a hard power cap or a soft power cap including converting a present allocated power level for all powered server blades to a hard cap power level when redundant allocated power is not available.

16. The method of claim 12, wherein dynamically managing the power supply allocation for each one of the plurality of server blades includes reallocating power when a blade powers off including:

detecting a previously powered on blade is now powered off; and incrementally increasing power allocated to each one of a plurality of powered on server blades when a present power allocation is not equal to a corresponding maximum power allocation for each of the plurality of powered on server blades.

17. The method of claim 16, wherein incrementally reducing the allocated power for the first server blade includes reducing the allocated power by a selected percentage.

18. The method of claim 16, wherein calculating the power cap necessary power on the selected server blade further includes selecting a subsequent server blade that is presently powered on and incrementally reducing an allocated power for the subsequent server blade when the subsequent server blade is allocated power greater than a corresponding minimum power requirement for the subsequent server blade.

* * * * *

UNITED STATES PATENT AND TRADEMARK OFFICE
CERTIFICATE OF CORRECTION

| | | |
|---|---|---|
| PATENT NO. | : 9,021,290 B2 | Page 1 of 1 |
| APPLICATION NO. | : 13/440829 | |
| DATED | : April 28, 2015 | |
| INVENTOR(S) | : Hueston et al. | |

It is certified that error appears in the above-identified patent and that said Letters Patent is hereby corrected as shown below:

Specification

In column 2, line 23, delete "includes" and insert -- include --, therefor.

In column 12, line 35, delete "maybe" and insert -- may be --, therefor.

Signed and Sealed this
Ninth Day of February, 2016

Michelle K. Lee
*Director of the United States Patent and Trademark Office*